May 9, 1972  A. HARDY ET AL  3,661,811
COMPOSITIONS FOR MOLDING POLYURETHANE FOAM ARTICLES
Filed Sept. 9, 1970
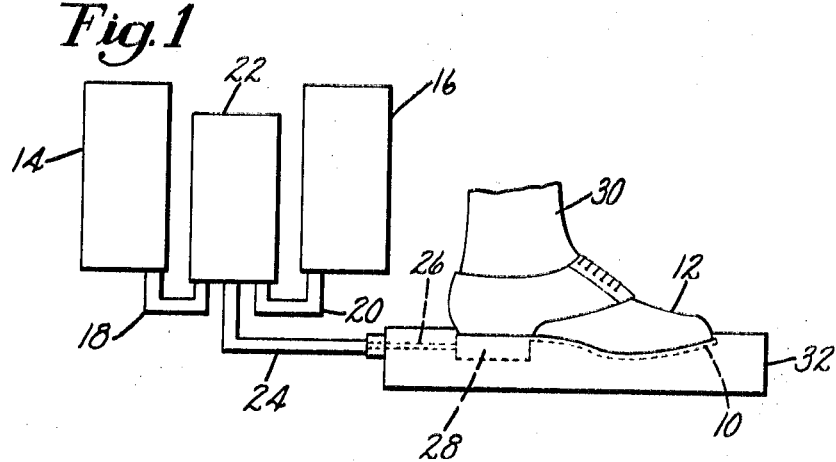
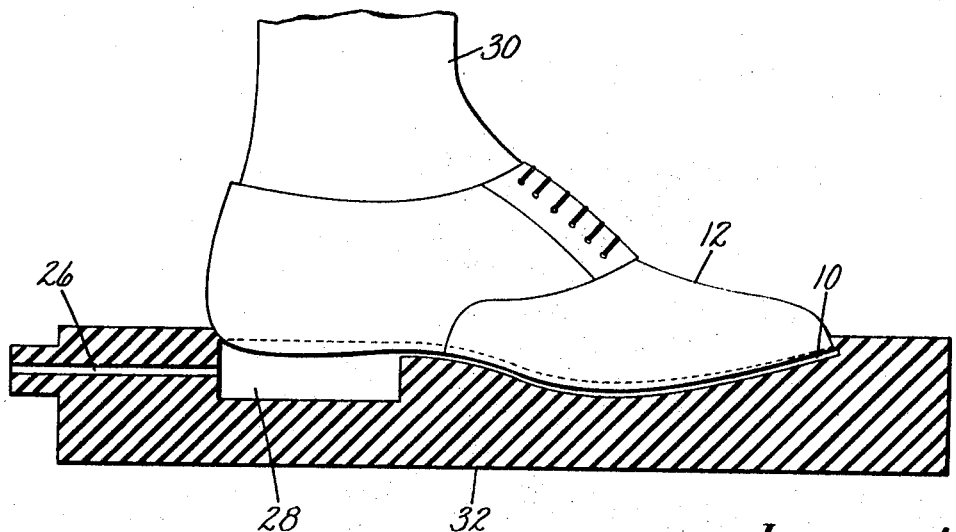
Inventors
Alan Hardy
David T. Messenger
Austin T. Carpenter
By their Attorney
Benjamin C. Pollard

United States Patent Office 3,661,811
Patented May 9, 1972

3,661,811
COMPOSITIONS FOR MOLDING POLYURETHANE FOAM ARTICLES
Alan Hardy, David T. Messenger, and Austin T. Carpenter, Leicester, England, assignors to USM Corporation, Flemington, N.J.
Filed Sept. 9, 1970, Ser. No. 70,801
Claims priority, application Great Britain, Oct. 4, 1969, 48,850/69
Int. Cl. C08g 22/16, 22/44
U.S. Cl. 260—2.5 AN
8 Claims

ABSTRACT OF THE DISCLOSURE

Process and composition for molding polyurethane foam articles, particularly for molding polyurethane foam outsoles in which a diisocyanate is reacted with a hydroxyl terminated polyester and a chain extender mixture of an aliphatic diol and a hydroxyl terminated adduct of diisocyanate and an aliphatic diol.

FIELD OF THE INVENTION

This invention relates to a composition for polyurethane foam molding, particularly for direct molding of polyurethane foam to form soles on shoe uppers.

BACKGROUND OF THE INVENTION

Foamed polyurethane compositions have become commercially accepted for various purposes, and it has been proposed to employ polyurethane compositions in the manufacture of cellular shoe soles. However, it has proved difficult to formulate a chemical composition having an optimum combination of suitable properties to enable its use to provide commercially acceptable shoe soles. Outsoles have severe requirements as to mechanical properties because of the flexing, abrasion, shock and other stresses to which an outsole is subjected as well as the extreme ranges of temperatures, water, oil and other use conditions. Compositions meeting these requirements in general for introduction into mold cavities for the molding of cellular polyurethane shoe soles have included a diisocyanate with which were reacted a hydroxyl terminated polyester having a molecular weight in excess of 2500 and, as a chain extender, a linear aliphatic diol having from 2 to 8 carbons per molecule.

While the resulting molded soles were acceptable from the mechanical point of view, the exposed surface of at least some of the shoe soles made with this reaction mixture were found to crack or craze if the sole is flexed during or immediately after removal of the shoe sole from the mold in which it is made. This cracking was not found seriously to impair the wearing properties of the shoe sole, but it was undesirable from the standpoint of appearance.

SUMMARY OF THE INVENTION

It is an object of the present invention to provide an improved chemical composition for molding outsoles for shoes.

We have found that the incidence of surface cracking of a cellular polyurethane shoe sole formed from reactants comprising isocyanate material having two reactive isocyanate groups per molecule, a hydroxyl terminated polyester and a chain extender, can be restricted if the linear aliphatic diol chain extender is replaced in part by a hydroxyl terminated adduct of a diisocyanate and an aliphatic diol.

DESCRIPTION OF THE DRAWING

The invention will be described further in connection with the attached drawings, in which:

FIG. 1 is a schematic view of equipment useful in practicing the method of the present invention; and FIG. 2 is a view on a larger scale of a portion of the system including the mold and a shoe upper disposed in relation thereto with parts broken away.

The molding of polyurethane foam tread members 10 on shoe uppers 12 (see FIGS. 1 and 2) includes the steps of supplying measured relative quantities of reactive components from supply chambers 14 and 16 through conduits 18 and 20 respectively to a high speed mixer 22, mixing the components and discharging the mixture through conduit 24 and inlet port 26 into a molding chamber 28 defined by the bottom of a shoe upper 12, shown mounted on a form 30, and the tread-forming mold 32. The mixture foams promptly to fill the molding chamber 28 and establish adhesive engagement with the bottom of the shoe upper. After the mixture has reacted to develop strength and resilience, the shoe 12 with the tread member 10 attached to it is separated from the mold 32. The mold shown is formed of resilient material such as a silicone rubber providing a chamber shaped like a shoe sole and heel from which the molded tread member may be removed by distortion of portions of the mold. It will be understood that molds of rigid material constructed to allow removal of the molded material may also be used.

The reactants for combination to form a cellular shoe sole include (A) a polyester material having reactive hydroxyl groups and having a molecular weight in excess of 2500 corresponding to the product of esterifying one or more linear dicarboxylic acids of the general formula:

$$HOOC(CH_2)_nCOOH$$

(where $n$ is an an integer from 3 to 10), with a linear, preferably aliphatic diol such as a lower polyethylene glycol for example diethylene glycol or more preferably triethylene glycol, i.e., a compound having the formula:

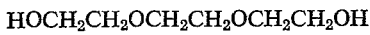

$$HOCH_2CH_2OCH_2CH_2OCH_2CH_2OH$$

(B) a linear aliphatic diol having from 2 to 8 carbon atoms per molecule, (C) a hydroxyl terminated adduct material from reaction of diisocyanate and a linear aliphatic diol having from 2 to 8 carbon atoms in its molecule as chain extender, and (D) an isocyanate material having two reactive isocyanate groups per molecule for reaction with the active hydrogen atoms of the polyester, the diol and the adduct.

The isocyanate material having two reactive isocyanate groups per molecule may be an isocyanate terminated polymer. However, we prefer to use an aromatic diisocyanate monomer particularly 4,4'-diphenylmethane diisocyanate (hereinafter referred to as MDI) because the material reacts fairly quickly and also, each of the —NCO groups of the molecule is of similar reactivity so that the reaction proceeds evenly. Pure MDI is preferred although it is solid at room temperature and requires heating slowly to about 50° C. to liquefy it for use in a method as set forth in the last preceding paragraph. So-called "liquid MDI" may also be used, but this material contains trifunctional material formed by association of carbodimide molecules and molecules of MDI, which trifunctional material decomposes at temperatures in excess of about 130° C. The presence of this trifunctional material tends to give cross linking in the composition which may be undesirable if present to a large extent in a shoe sole, as it may lead to undesirable cracking. The quantity of isocyanate material used affects the extent of cure and the stiffness of the resulting product, and may also affect the amount of cell formation. In forming a sole, if too little isocyanate is used the sole may be soft and incompletely cured, whereas if too much is used the sole may be very stiff. The ratio of reactive hydrogen atoms of water, hydroxyl, carboxyl or amine groups present in the reactant mixture to reactive isocyanate groups present may be between 100:90 and 100:110, and is preferably between 100:95 and 100:101; the lower quantities of isocyanate generally give softer products and the higher quantities of isocyanate generally give tougher products.

The polyester employed may be the product of condensing and polymerizing one or more linear dicarboxylic acids of the general formula:

$$HOOC(CH_2)_nCOOH$$

where $n$ is an integer from 3 to 10 and a linear, preferably aliphatic diol such as a lower polyethylene glycol, for example, diethylene glycol or more preferably triethylene glycol,, i.e., a compound having the formula:

$$HOCH_2CH_2OCH_2CH_2OCH_2CH_2OH$$

the polymerization being carried to an extent to give a molecular weight in excess of 2500. The preferred dicarboxylic acids are adipic acid and sebacic acid and with these acids the most preferred molecular weight range for the polyester is from 2800 to 3700. Where the polyester is derived from adipic acid, material having a molecular weight of about 3000 is particularly convenient because of its melting point when pure MDI is used as the isocyanate material. We prefer to use the preferred polyester materials in quantities such that the ratio of reactive hydrogen atoms from water, hydroxyl, carboxyl or amino groups present in the reactant mixture to reactive isocyanate groups present is about 1:1. The polyester material may be made using conventional techniques using the appropriate acids or their esters with the diol.

The polyurethane material may be expanded to form the desired cellular product by the interaction of water or compounds providing carboxylic acid radicals with isocyanate to generate $CO_2$ or, alternatively, volatile organic liquids such as methylene chloride, trichloromonofluoromethane and other volatile halogenated, preferably fluorine-containing organic liquids may be used. Where water is used, from 0.2% to 0.5%, preferably about 0.3% is used based on the weight of the resinous, e.g. polyester diol material. Where a volatile organic liquid is used there will ordinarily be used from about 5 to about 7 parts by weight based on 100 parts by weight of the resinous material.

The chain extending agent preferably comprises in admixture a linear aliphatic diol of the general formula $HO(CH_2)_mOH$ where $m$ is an integer from 2 to 8 and a hydroxy terminated adduct material formed by reaction of a diisocyanate such as mixed isomers of tolylene diisocyanate with a linear aliphatic diol of the same class. PPreferably the linear aliphatic diol is 1,4-butane diol, but other diols or mixtures of diols may be used. The stiffness and extent of cure of the sole depend in part upon the relative quantities of polyester and chain extender used, and we prefer to employ from 3⅓ to 5 chemical equivalents of chain extender to 1 chemical equivalent of polyester material. A preferred adduct is one prepared by reaction of more than two, e.g., 3 moles of 1,4-butane diol with 1 mole of a mixture of 2,4- and 2,6-isomers of tolylene diisocyanate in the ratio of about 80% to 20% by weight respectively the product of this reaction may be considered as comprising a solution in 1,4-butane diol of a hydroxyl terminated adduct in which two molecules of 1,4-butane diol are linked together by one molecule of diisocyanate residue thus:

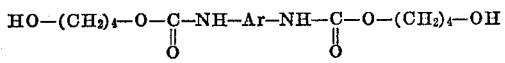

wherein the preferred adduct the aromatic residue "Ar" is the tolylene radical. The presence of the adduct in the chain extending agent has an effect on the rate of curing of the composition, and the quantities of the adduct material used in the chain extending agent may be chosen in accordance with the effect required or tolerable having in mind the type and quantity of catalyst present, the way in which the composition is molded and the type of product required. As a general guide, when making shoe soles using preferred catalyst materials, and using a machine as described in U.S. Pat. 3,409,174, one may employ 1,4-butane diol and the preferred adduct material as chain extending agent with the adduct material present for example, to an extent of up to about 25% by weight of the chain extending agent, and preferably in quantities of between about 5% and about 7% by weight of the chain extending agent. The chain extending agent may be produced conveniently by simply adding a suitable quantity of 1,4-butane diol to the solution of adduct material in 1,4-butane diol when the reaction product has cooled.

A variety of catalyst materials may be employed for example, dibutyl tin dilaurate, ferric acetonyl acetonate, potasium acetate, triethylene diamine, lead naphthenate, phenyl mercuric propionate and mixtures thereof. We prefer to employ a mixture of ferric acetonyl acetonate and phenyl mercuric propionate, using not less than about 0.10 part by weight of the former per 100 parts by weight of the polyester material and not less than about 0.3 part by weight of the latter per 100 parts by weight of the polyester material. We prefer to use 0.15 part by weight ferric acetyl acetonate and 0.5 part by weight phenyl mercuric propionate per 100 parts by weight of the polyester material, and the catalyst material used in the illustrative composition comprises the preferred materials in the preferred ratio by weight.

Example

A viscous liquid polyester having a molecular weight of 3075, an OH value of 35.5 and an acid value of 1 was prepared by condensation and polymerization of adipic acid and triethylene glycol ($HOC_2H_4OC_2H_4OC_2H_4OH$).

To 100 parts by weight of this polyester there were added 0.39 part by weight of water, 14.1 parts by weight of 1,4-butane diol, 0.99 part by weight of the hydroxyl terminated adduct solution from mixing and reaction of 945 grams of 1,4-butane diol and 609 grams of an 80:20 mixture of the 2,4- and 2,6-isomers of tolylene diisocyanate, 0.15 part by weight of ferric acetonyl acetonate, 0.5 part by weight of phenyl mercuric propionate, 0.8 part by weight of silicone oil wetting agent and 1.0 part by weight of pigment. This composition, constituting a Part A of two parts to be mixed to form a polyurethane foam provides a ratio of 15.1% by weight of chain extender to polyester with the adduct providing about 5.2% by weight of the chain extending agent.

The part B for combination with the Part A was molten 4,4-diphenyl methane diisocyanate in quantity to provide an NCO:OH ratio of 1:1. The Part A and Part B were placed in tanks of a storage device of a machine constructed, arranged and adapted to operate substantially as described in the complete specification of U.S. Letters Patent No. 3,409,194. The tanks were provided with heating arrangements so that the Parts A and B could be warmed so that they could be passed through the machine without undue difficulty. The two Parts A and B were fed through the machine and the appropriate quantities thereof mixed and dispensed into a mold in the manner described in said specification. The mold used comprised a silicone rubber base (having a cavity shaped like a shoe sole and heel unit for women's size 5 shoe having a sole about ¼" thick) and was closed by a shoe bottom of a shoe mounted on a foot form. Holes were provided at "toe" and "heel" end portions of the mold, one to permit passage of the mixed composition into the cavity and one to permit escape of air from cavity. Heaters were provided in the mold base so that the temperature of the mold surface could be controlled.

When the composition dispensed into the mold cavity had cured, the molded unit was removed from the mold and the sole was inspected. It was found to have a good surface finish, which did not crack readily when removed from the mold with reasonable care. When the sole was fully cured it was tested and found to have good flexing and tear resisting properties.

Having thus described our invention, what we claim as new and desire to secure by Letters Patent of the United States is:

1. In a composition for reaction to form a tough resilient polyuretane foam comprising a mixture of (1) an organic compound having more than one reactive isocyanate group per molecule, (2) a polyester material having more than one reactive hydroxyl group, (3) a chain extending agent comprising a linear aliphatic diol of the general formula $HO(CH_2)_mOH$ where $m$ is an integer from 2 to 8, (4) a blowing agent and (5) a catalyst for the reaction between the compound having isocyanate groups and the active hydrogens of said polyester and said chain extending compounds the improvement wherein the chain extending agent also comprises a hydroxyl terminated adduct from reaction of at least two mols of a linear aliphatic diol of the general formula $HO(CH_2)_mOH$ with one mol of an aromatic diisocyanate, said adduct being present to the extent of up to about 25% by weight of said chain extending agent.

2. A composition for reaction to form a polyurethane foam as defined in claim 1 in which said polyester is a hydroxyl terminated product of condensing and polymerizing one or more linear dicarboxylic acids of the general formula $HOOC(CH_2)_nCOOH$ where $n$ is an integer from 3 to 10 and a lower polyethylene glycol and has a molecular weight of from about 2500 to about 4000, in which said adduct is employed to the extent of up to about 25% by weight based on the weight of said chain extending agent and in which the ratio of reactive hydrogen atoms from said polyester and said chain extending agent to reactive isocyanate groups is in the range of ratios of from 100:90 to 100:110.

3. A composition for reaction to form a polyurethane foam as defined in claim 2 in which said polyethylene glycol is a compound having the formula $HOCH_2CH_2OCH_2CH_2OCH_2CH_2OH$ and said ratio of reactive hydrogen atoms to reactive isocyanate groups is in the range of ratios of 100:95 to 100:101.

4. A composition for reaction and molding to form a polyurethane foam outsole as defined in claim 3 in which said dicarboxylic acids are selected from the group consisting of adipic acid and sebacic acid, the molecular weight of said polyester is from about 2800 to about 3700 and the adduct is employed in amount of from about 5% to about 7% by weight based on the weight of said chain extending agent.

5. A composition for reaction and molding to form a polyurethane foam outsole as defined in claim 4 in which from about 3⅓ to about 5 chemical equivalents of said chain extender are employed to one chemical equivalent of said polyester.

6. A composition for reaction and molding to form a polyurethane foam outsole as defined in claim 5 in which said chain extender is a solution in 1,4-butane diol of the adduct from reaction of 1 mol of tolylene diisocyanate with more than two mols of 1,4-butane diol and the foaming reaction is improved by a catalyst mixture at least 0.1% by weight of ferric acetonyl acetonate and at least 0.3% by weight of phenyl mercuric propionate, said catalyst percentages being based on the weight of said polyester.

7. A composition for reaction and molding to form a polyurethane foam outsole as defined in claim 6 in which said blowing agent is carbon dioxide generated by reaction of isocyanate groups and at least one member of the group consisting of water and carboxyl groups and diisocyanate is employed in quantity to secure a ratio of reactive hydrogen atoms from said polyester, chain extending agent and member of the group consisting of water and carboxyl groups in the range of ratios of 100:95 to 100:101.

8. A composition for reaction and molding to form a polyurethane foam outsole as defined in claim 6 in which said blowing agent is a volatile organic liquid dispersed in the reaction mixture.

References Cited

UNITED STATES PATENTS 3,391,093  7/1968  Frost _____ 260—2.5 AN

FOREIGN PATENTS 6810296  1/1969  Netherlands _____ 260—2.5 AM
264,013  5/1963  Australia _____ 260—2.5 AN

OTHER REFERENCES

South African Patent Journal; January 1971, at p. 246 abstract of patent 69/4,205, filed June 13, 1969.

DONALD E. CZAJA, Primary Examiner

C. W. IVY, Assistant Examiner

U.S. Cl. X.R.

260—2.5 AM, AB; 264—45, 54, 244